(12) United States Patent
Meunier

(10) Patent No.: US 9,304,217 B2
(45) Date of Patent: Apr. 5, 2016

(54) RETRIEVABLE VERTICAL HYDROPHONE CABLE AND METHOD

(71) Applicant: CGGVERITAS SERVICES SA, Massy (FR)

(72) Inventor: Julien Meunier, Paris (FR)

(73) Assignee: CGGVERITAS SERVICES SA, Massy (FR)

(*) Notice: Subject to any disclaimer, the term of this patent is extended or adjusted under 35 U.S.C. 154(b) by 453 days.

(21) Appl. No.: 13/845,591

(22) Filed: Mar. 18, 2013

(65) Prior Publication Data

US 2013/0250724 A1 Sep. 26, 2013

Related U.S. Application Data

(60) Provisional application No. 61/614,700, filed on Mar. 23, 2012.

(51) Int. Cl.
| | | |
|---|---|---|
| *G01V 1/16* | (2006.01) | |
| *G01V 1/40* | (2006.01) | |
| *G01V 1/20* | (2006.01) | |
| *G01V 11/00* | (2006.01) | |

(52) U.S. Cl.
CPC ............... *G01V 1/201* (2013.01); *G01V 1/166* (2013.01); *G01V 1/168* (2013.01); *G01V 1/40* (2013.01); *G01V 11/005* (2013.01)

(58) Field of Classification Search
CPC ....... G01V 1/16; G01V 11/005; G01V 1/166; G01V 1/168; Y10S 367/911; Y10S 181/401
USPC ................... 367/25; 181/102, 104; 340/856.2
See application file for complete search history.

(56) References Cited

U.S. PATENT DOCUMENTS

| | | | | |
|---|---|---|---|---|
| 4,413,678 | A * | 11/1983 | Gillespie | 166/57 |
| 4,899,320 | A * | 2/1990 | Hearn et al. | 367/35 |
| 5,050,690 | A * | 9/1991 | Smith | 175/50 |
| 5,627,143 | A * | 5/1997 | Sawdon | 507/103 |
| 6,584,038 | B2 | 6/2003 | Meunier | |
| 7,954,595 | B1 * | 6/2011 | Kalinski | 181/104 |
| 2012/0071367 | A1 * | 3/2012 | Falana et al. | 507/103 |

FOREIGN PATENT DOCUMENTS

WO 2004/095075 A2 11/2004

* cited by examiner

*Primary Examiner* — Ian J Lobo
(74) *Attorney, Agent, or Firm* — Patent Portfolio Builders PLLC

(57) ABSTRACT

Method and retrievable vertical hydrophone cable for collecting seismic data underground. The retrievable vertical hydrophone cable includes an envelope having a first end at which a connector mechanism is provided to close the envelope; plural hydrophones distributed inside the envelope at predetermined positions; and a fluid provided inside the envelope and around the plural hydrophones. The envelope increases its volume when the fluid is pressurized through the connector mechanism.

20 Claims, 6 Drawing Sheets

RETRIEVABLE VERTICAL HYDROPHONE CABLE AND METHOD

BACKGROUND

1. Technical Field

Embodiments of the subject matter disclosed herein generally relate to methods and systems for collecting seismic data using a vertical hydrophone cable and, more particularly, to mechanisms and techniques for increasing a coupling of the hydrophones from a vertical hydrophone cable to the ground.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

Traditionally, as illustrated in FIG. 1, a land seismic survey 100 that uses vertical hydrophone cables is performed in the following way. Plural hydrophones 102 are electrically connected to each other along a cable 104. A well 106 is dug into the ground 108 to accommodate the plural hydrophones.

After all the hydrophones have been deployed, one or more seismic sources are brought into the field and actuated to generate the seismic waves. The seismic waves propagate through the ground until they are reflected by various reflectors. The reflected waves propagate to the hydrophones, where a pressure change of the earth is recorded. However, if the coupling between the hydrophone and the dirt around the hydrophone is not good, the recorded data is of poor quality.

A hydrophone typically has a cylindrical shape and a small size. Thus, a coupling between the hydrophone and the well might be a problem when the hydrophone does not tightly fit into the well (supposing that the hydrophone is directly placed into the well). The coupling is improved if the diameter of the hydrophone is close to the diameter of the well, i.e., if the hydrophone is in tight contact with the walls of the well. However, obtaining a tight contact is a difficult problem. Thus, the coupling between the ground and hydrophone is traditionally poor, and also not well understood. The hydrophone-ground coupling may be defined as the difference between the pressure measured by the hydrophone and the pressure in the ground without the hydrophone. This definition is appropriate for designing a hydrophone.

However, once the hydrophone is designed and needs to be deployed, the practicing geophysicist has to deal with the fact that the hydrophone may not be appropriately deployed. For example, the hydrophone may not be "well" coupled to its surroundings. In this situation, the above definition might not be appropriate. For this situation, those skilled in the art would consider that a "bad" hydrophone coupling refers to the difference between the pressure as measured by the badly coupled hydrophone and the pressure as measured by the well-coupled hydrophone.

Irrespective of the used definition, the ground-hydrophone coupling is a persistent problem in the art because it is problematic to make the casing of the hydrophone to lightly contact the well and, at the same time, to ensure that the hydrophones are easily retrievable from the well when desired. One method known in the industry is to attach a cable 110 with a high mechanical resistance to the casing of each hydrophone and, when the time arrives to remove the hydrophones, to pull this cable up. However, if the well has collapsed at the location of one hydrophone, that hydrophone may be stuck at that position and even pulling the cable 110 may not retrieve the hydrophone.

Therefore, there is a need to improve the coupling of the hydrophone to the ground and at the same time to make easier and safer the process of retrieving the hydrophones.

SUMMARY OF THE INVENTION

According to an exemplary embodiment, there is a retrievable vertical hydrophone cable for collecting seismic data underground. The retrievable vertical hydrophone cable includes an envelope having a first end at which a connector mechanism is provided to close the envelope, plural hydrophones distributed inside the envelope at predetermined positions, and a fluid provided inside the envelope and around the plural hydrophones. The envelope increases its volume when the fluid is pressurized through the connector mechanism.

According to another exemplary embodiment, there is a retrievable vertical hydrophone cable for collecting seismic data underground. The retrievable vertical hydrophone cable includes an envelope, a hydrophone provided inside the envelope at a predetermined position, and a fluid provided inside the envelope and around the plural hydrophones. The envelope is configured to increases its volume to increase the coupling between the hydrophone and a wall of a well in which the retrievable vertical hydrophone cable is deployed.

According to still another exemplary embodiment, there is a method for deploying a retrievable vertical hydrophone cable in a well for collecting seismic data. The method includes a step of inserting an envelope that includes plural hydrophones into the well, wherein the plural hydrophones are surrounded by a fluid trapped inside the envelope, a step of pressurizing the fluid while the envelope is inside the well to increase the volume of the envelope until the exterior of the envelope contacts walls of the well, and a step of recording seismic data with the hydrophones.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a retrievable vertical hydrophone cable. However, the embodiments to be discussed next are not limited to a vertical hydrophone cable, but may be applied to slanted cables and also to cables having combined geophones and hydrophones or combined cables of geophones and cables of hydrophones, or other sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a retrievable vertical hydrophone cable for collecting seismic data underground. The retrievable vertical hydrophone cable includes an envelope, a hydrophone (or a geophone or a combination of the two) provided inside the envelope at a predetermined position, and a fluid provided inside the envelope and around the hydrophone and configured to expand the envelope to improve the contact between the envelope and the wall of a well in which the retrievable vertical hydrophone cable is inserted.

Figure 1:
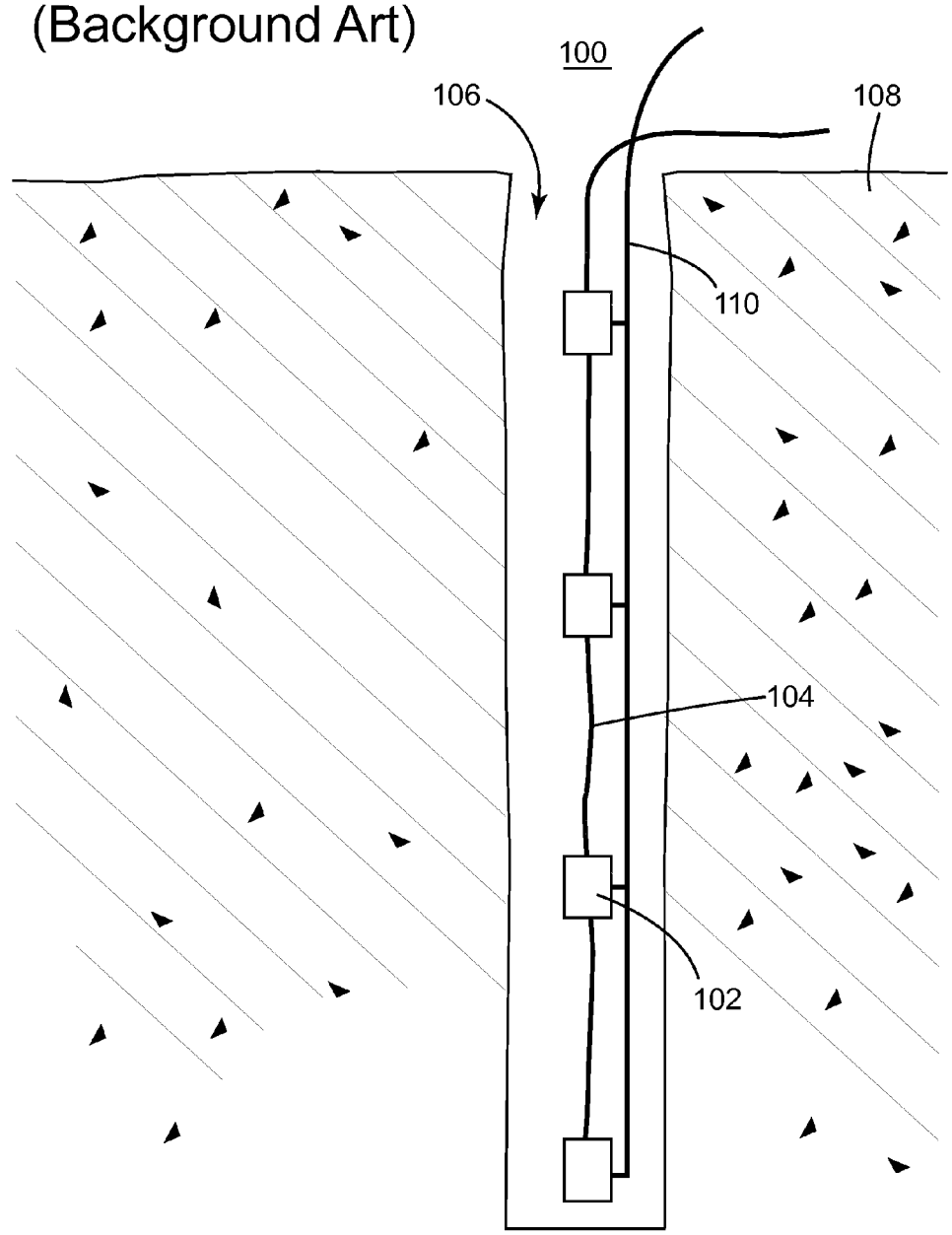
FIG. 1 illustrates a vertical arrangement of hydrophones deployed in a ell.
Figure 2:
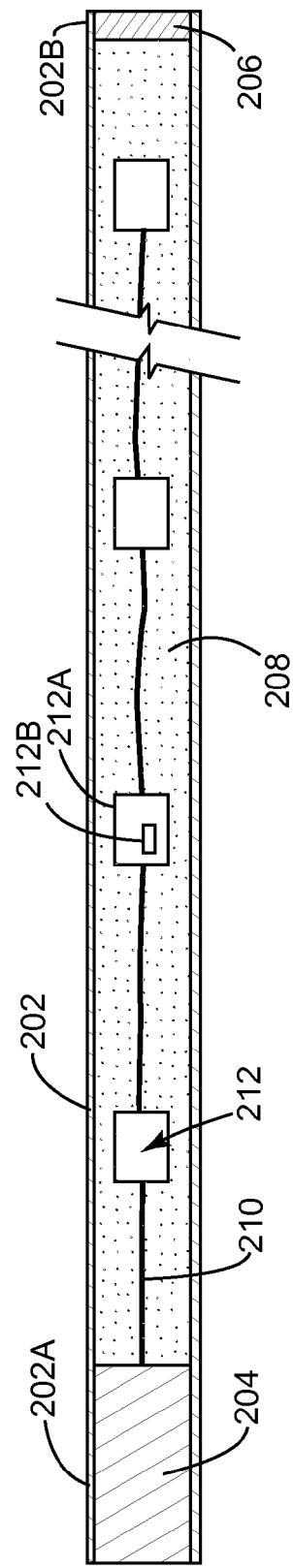
FIG. 2 is a schematic diagram of a retrievable vertical hydrophone cable according to an exemplary embodiment.

According to an exemplary embodiment illustrated in FIG. 2, a retrievable vertical hydrophone cable 200 includes an envelope 202 that has, at one end 202A, a connector mechanism 204 and, at the other end 202B, a cap 206 so that a fluid 208 provided inside the envelope 202 does not leak to the ambient. The connector mechanism 204 is configured to hydraulically connect the inside of the envelope 202 to a pump (not shown) or a fluid source for providing the fluid 208. A pressure of the fluid 208 inside the envelope may be controlled, as will be discussed later.

Further, the connector mechanism 204 and the cap 206 are so configured that the fluid 208 does not leak outside the envelope 202 when the fluid 208 is pressurized. An electric cable 210 connects the connector mechanism 204 to each of the hydrophones 212 distributed inside the vertical hydrophone cable 200. In the following, it is noted that the term "vertical" means that an angle formed between the hydrophone cable 200 and gravity is smaller than a few degrees, e.g., smaller than 10 degrees.

A hydrophone 212 includes a casing 212A inside which is provided a hydrophone sensor 212B. A hydrophone sensor is configured to detect pressure changes. As the hydrophone is configured to detect a pressure change in the environment, the hydrophone 212 is floating in the fluid 208, which transmits the pressure changes from the envelope. Thus, the envelope 202 is made of a flexible material, for example, polyurethane. In this way, any pressure change in the dirt around the vertical hydrophone cable 200 is accurately transmitted to the envelope 202, then to the fluid 208, and finally to the hydrophone 212.

Figure 3:
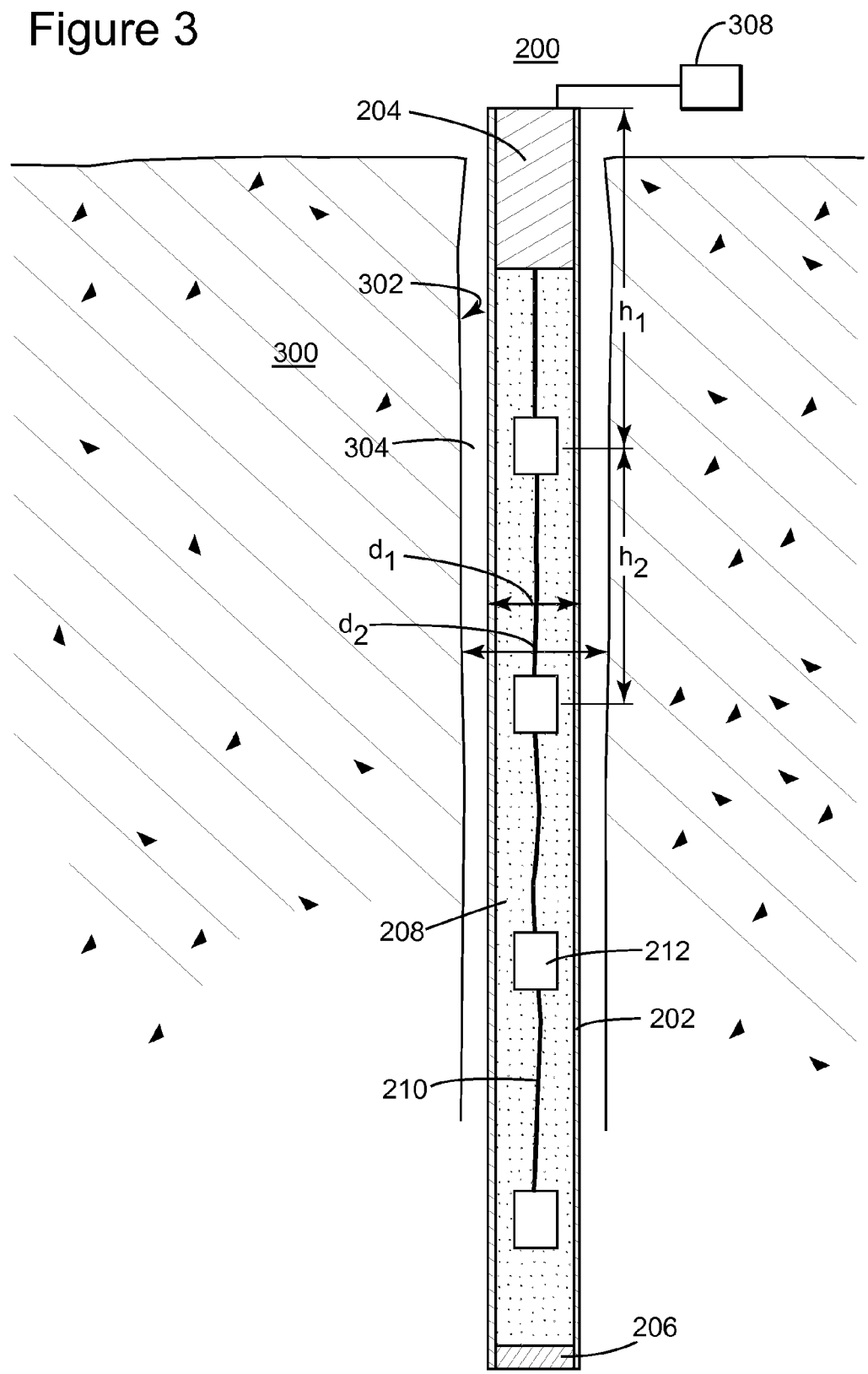
FIG. 3 illustrates a retrievable vertical hydrophone cable deployed in a well according to an exemplary embodiment.

To improve the coupling between the envelope 202 and the ambient soil 300 of a well 302, as shown in FIG. 3, the fluid 208 is pressurized by a pump 308. The fluid 208 inside the envelope 202 hydraulically communicates with the pump 308 through the connector mechanism 204. The connector mechanism 204 also provides data communication and/or power supply through the electric cable 210, which is also connected to the hydrophones. In one application, more than one cable may be provided in the well, for example, one with geophones and one with hydrophones.

The fluid 208 may be a bio-degradable oil, a mineral oil, water, etc. One purpose of the fluid 208 is to ensure better contact between the envelope (and consequently the hydrophone) and the walls of the well. This is further explained next while also explaining how the retrievable vertical hydrophone cable is deployed and retrieved from a well.

The retrievable vertical hydrophone cable 200 is initially inserted into the well 302 having a given amount of the fluid 208. This fluid is not under pressure except its own hydrostatic pressure. A distance h1 between the connector mechanism 204 and the first hydrophone 212 is about 2 to 4 m. A distance between adjacent hydrophones is about 1.5 to 3 m. Other distances may be used as a function of the goals of the seismic survey. Any number of hydrophones may be attached to the vertical hydrophone cable 200. However, a length of the vertical hydrophone cable 200 is between 3 and 10 m.

To easily insert the vertical hydrophone cable 200 into the well 302, the external diameter d1 of the retrievable vertical hydrophone cable 200, i.e., an external diameter of the envelope 202, is slightly smaller than the internal diameter d2 of the well 302. Once the retrievable vertical hydrophone cable 200 is in place, a gap 304 (exaggerated in FIG. 3; however, for a practical application, if the diameter d1 is about 4 cm, then the internal diameter d2 of the well 302 is desired to be about 5 cm) between the envelope 202 and the walls of the well 302 is reduced by pressurizing the fluid 208 with the pump 308. As a result of this action, the volume of the envelope 202 increases and thus, the external surface of the envelope 202 presses against the well 302, reducing or eliminating the gap 304. In this way, the coupling between the hydrophone 212 and the well 302 is improved. The connector mechanism 204 may be directly connected to the pump 308 or together with similar connector mechanisms from other retrievable vertical hydrophone cables.

The fluid 208 is trapped inside the envelope and it is supposed to not escape outside the envelope except in a controlled way through the connector mechanism 204. In the event that the integrity of the envelope is compromised, if the fluid 208 is a bio-degradable oil or ater, there is minimal impact to the environment. Other types of fluids may be used.

Seismic data from the hydrophones is collected through the electrical cable 210. This cable connects each hydrophone to the connector mechanism 204. Thus, the connector mechanism 204 is an electric and hydraulic connector.

After the seismic survey has been completed, to retrieve the retrievable vertical hydrophone cable 200, part of the fluid 208 is released from the envelope 202 or its pressure is decreased, so that the envelope is deflated (i.e., its volume is reduced) to not be under tight contact with the walls of the well 302. In this way, the retrievable vertical hydrophone cable 200 can easily be retrieved to the surface.

Figure 4:
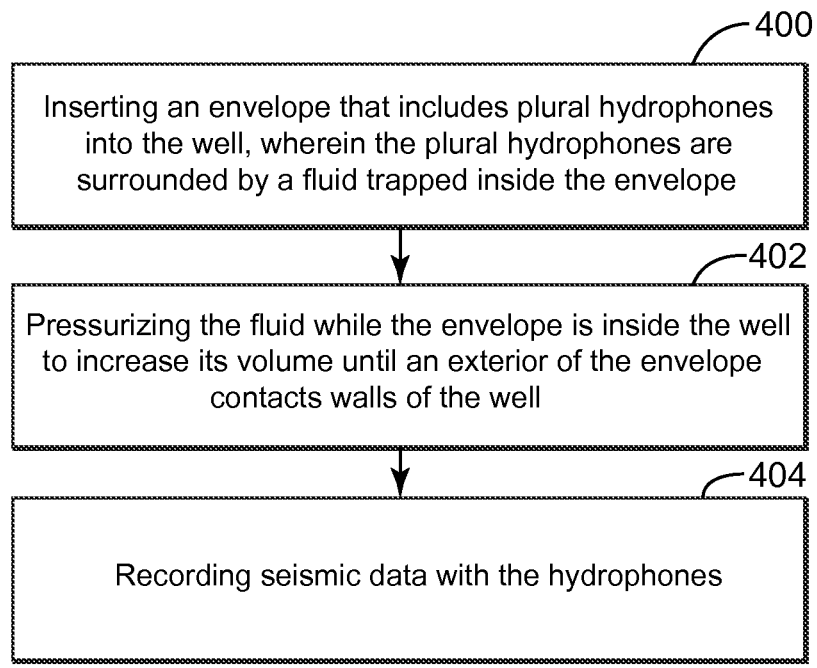
FIG. 4 is a flowchart of a method for deploying a retrievable vertical hydrophone cable in a well according to an exemplary embodiment.

The above process may be summarized based on the flowchart shown in FIG. 4 as follows. FIG. 4 illustrates a method for deploying a retrievable vertical hydrophone cable for collecting seismic data. The method includes a step 400 of inserting an envelope that includes plural hydrophones into the well, wherein the plural hydrophones are surrounded by a fluid trapped inside the envelope; a step 402 of pressurizing the fluid while the envelope is inside the well to increase its volume until an exterior surface of the envelope contacts walls of the well; and a step 404 of recording seismic data with the hydrophones. Optionally, the method may include a step of removing part of the fluid from the envelope to reduce its volume and form a gap between the exterior surface of the envelope and the walls of the well and a step of removing the retrievable vertical hydrophone cable from the well.

Figure 5:
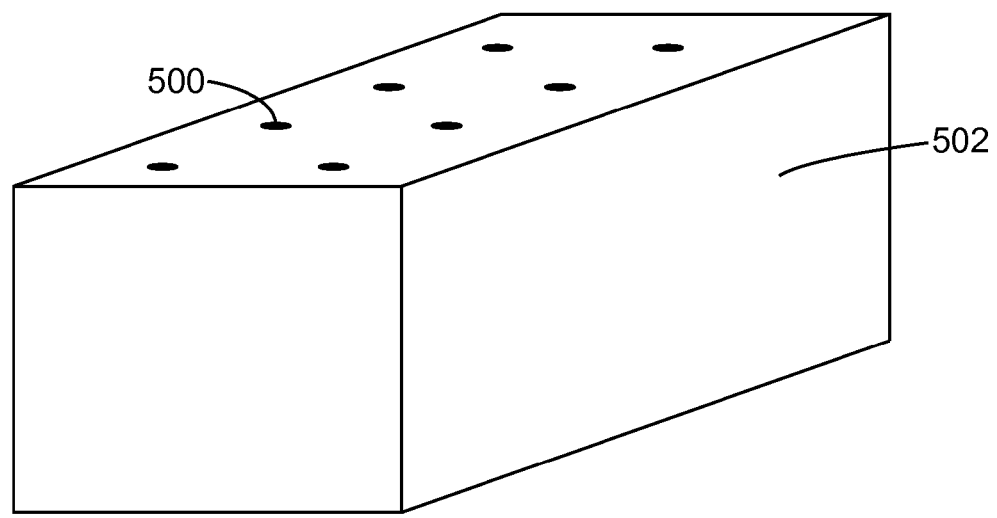
FIG. 5 is a schematic diagram of horizontally deployed hydrophones.
Figure 6:
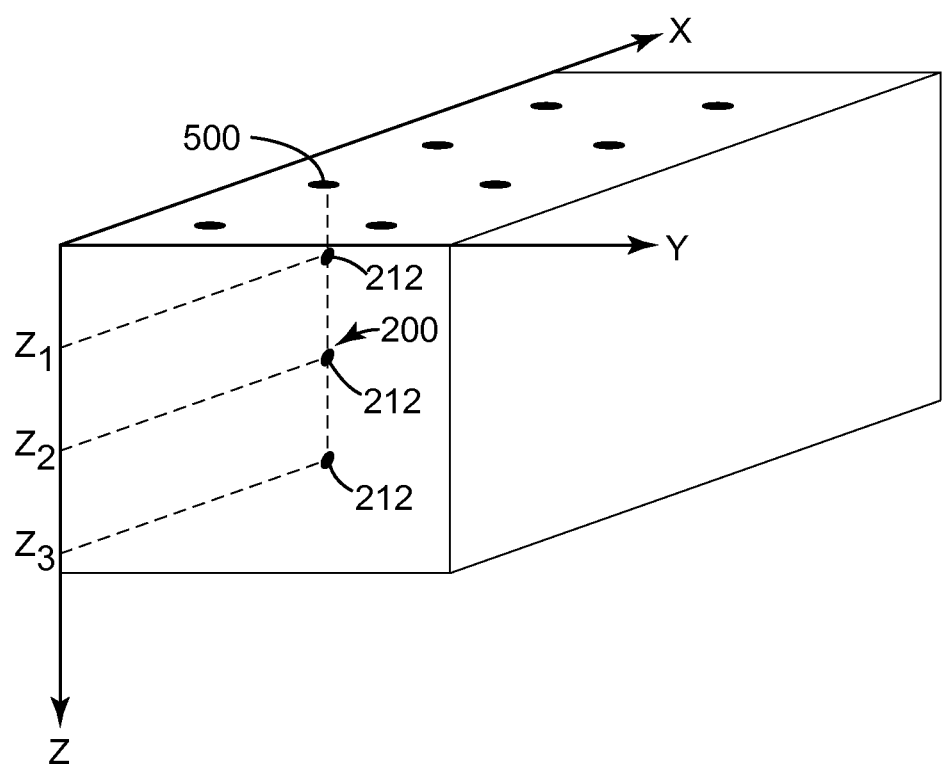
FIG. 6 is a schematic diagram of vertically deployed hydrophones according to an exemplary embodiment.

It is noted that the retrievable vertical hydrophone cable is intended to replace traditional geophones 500 that are deployed, in a horizontal manner, above or below ground 502 as illustrated in FIG. 5. In this way, instead of having a single geophone 500 at a given X and Y position, a string of hydrophones is deployed at the same X and Y position, each hydrophone 212 of the cable 200 having a different depth Z as illustrated in FIG. 6. In this way, it is expected, besides a better coupling, to eliminate horizontal filtering which currently reduces noise but damages the signal, and also to record the seismic data in a quieter environment. Additionally, it is expected to observe a lower level of ground roll and to use some properties of Rayleigh waves to separate them from signal.

The disclosed exemplary embodiments provide a method and a retrievable vertical hydrophone cable. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A retrievable vertical hydrophone cable for collecting seismic data underground, the retrievable vertical hydrophone cable comprising:
    an envelope having a first open end at which a connector mechanism is provided to close the envelope and a second open end closed with a cap;
    a cable located inside the envelope;
    plural hydrophones distributed along the cable inside the envelope at predetermined positions such that the plural hydrophones have different depths in a well; and
    a fluid provided inside the envelope and around the plural hydrophones,
    wherein the envelope increases its volume when the fluid is pressurized through the connector mechanism and the envelope is retrievable when part of the fluid is removed.

2. The retrievable vertical hydrophone cable of claim 1, wherein additional fluid is pushed into the envelope through the connector mechanism.

3. The retrievable vertical hydrophone cable of claim 1, wherein the second end of the envelope is sealed by the cap so that the fluid is confined inside the envelope.

4. The retrievable vertical hydrophone cable of claim 1, wherein an entire space inside the envelope, between adjacent hydrophones, is filed with the fluid.

5. The retrievable vertical hydrophone cable of claim 1, wherein the fluid is bio-degradable oil.

6. The retrievable vertical hydrophone cable of claim 1, wherein the envelope is flexible so that its volume increases when the fluid is pressurized.

7. The retrievable vertical hydrophone cable of claim 1, wherein the envelope is configured to enter inside a well extending through the ground when the fluid is not pressurized.

8. The retrievable vertical hydrophone cable of claim 7, wherein the envelope contacts a wall of the well and cannot be retrieved from the well when the fluid is pressurized.

9. The retrievable vertical hydrophone cable of claim 1, further comprising:
    an electrical cable connecting the connector mechanism to the hydrophones and configured to transmit recorded seismic data to the surface.

10. The retrievable vertical hydrophone cable of claim 1, further comprising:
    a pump connected to the connector mechanism and configured to pressurize the envelope.

11. A retrievable vertical hydrophone cable for collecting seismic data underground, the retrievable vertical hydrophone cable comprising:
    an envelope having first and second open ends, the first end being closed by a connector mechanism and the second end being closed by a cap;
    a cable extending through the envelope;
    plural hydrophones distributed along the cable inside the envelope at different positions; and
    a fluid provided inside the envelope and around the plural hydrophones,
    wherein the envelope is configured to increases its volume to increase a coupling between the hydrophones and a wall of a well in which the retrievable vertical hydrophone cable is deployed, and the envelope is retrievable when part of the fluid is removed.

12. The retrievable vertical hydrophone cable of claim 11, wherein additional fluid is pushed into the envelope through the connector mechanism to increase its volume.

13. The retrievable vertical hydrophone cable of claim 11, wherein the second end of the envelope is sealed by the cap so that the fluid is trapped inside the envelope.

14. The retrievable vertical hydrophone cable of claim 11, wherein an entire space inside the envelope, between adjacent hydrophones, is filed with the fluid.

15. The retrievable vertical hydrophone cable of claim 11, wherein the fluid is bio-degradable oil.

16. The retrievable vertical hydrophone cable of claim 11, wherein the envelope is made of polyurethane so that its volume increases when the fluid is pressurized.

17. The retrievable vertical hydrophone cable of claim 11, wherein the envelope is configured to enter inside the well extending through the ground when the fluid is not pressurized.

18. The retrievable vertical hydrophone cable of claim 17, wherein the envelope contacts a wall of the well and cannot be retrieved from the well when the fluid is pressurized.

19. A method for deploying a retrievable vertical hydrophone cable in a well for collecting seismic data, the method comprising:
    inserting an envelope that includes plural hydrophones into the well, wherein the plural hydrophones are surrounded by a fluid trapped inside the envelope;
    pressurizing the fluid while the envelope is inside the well to increase a volume of the envelope until an exterior of the envelope contacts walls of the well;
    recording seismic data with the hydrophones;
    removing a part of the fluid from the envelope; and retrieving the envelope from the well,
wherein the envelope has a first open end closed with a connector mechanism and a second open end closed with a cap, and the plural hydrophones are distributed along a cable located inside the envelope so that the hydrophones have different depths.

20. The method of claim 19, further comprising:
removing the part of the fluid from the envelope to reduce the volume of the envelope such that a gap is formed between the exterior of the envelope and the walls of the well.

* * * * *